(12) United States Patent
Latorre Reviriego et al.

(10) Patent No.: US 12,484,933 B2
(45) Date of Patent: Dec. 2, 2025

(54) DEVICE FOR COLLECTING UTERINE FLUID IN VIVO

(71) Applicant: UNIVERSIDAD DE MURCIA, Murcia (ES)

(72) Inventors: Rafael Latorre Reviriego, Murcia (ES); Analuce Canha Gouveia, Murcia (ES)

(73) Assignee: UNIVERSIDAD DE MURCIA, Murica (ES)

( * ) Notice: Subject to any disclaimer, the term of this patent is extended or adjusted under 35 U.S.C. 154(b) by 888 days.

(21) Appl. No.: 17/773,101

(22) PCT Filed: Oct. 30, 2020

(86) PCT No.: PCT/ES2020/070666
§ 371 (c)(1),
(2) Date: Apr. 29, 2022

(87) PCT Pub. No.: WO2021/084153
PCT Pub. Date: May 6, 2021

(65) Prior Publication Data
US 2022/0387075 A1 Dec. 8, 2022

(30) Foreign Application Priority Data
Oct. 31, 2019 (ES) .................. ES201930958

(51) Int. Cl.
*A61B 17/435* (2006.01)
*A61B 17/43* (2006.01)
(Continued)

(52) U.S. Cl.
CPC ............ *A61B 17/435* (2013.01); *A61B 17/43* (2013.01); *A61D 19/02* (2013.01); *A61D 19/04* (2013.01)

(58) Field of Classification Search
CPC ...... A61M 2025/0057; A61M 25/0138; A61M 25/0068; A61M 25/0051; A61M 25/007;
(Continued)

(56) References Cited

U.S. PATENT DOCUMENTS 3,838,681 A  10/1974 Dalton
5,083,572 A *  1/1992 Pokorny ............ A61B 10/0291
                                              604/93.01
(Continued)

FOREIGN PATENT DOCUMENTS

EP  0262966  4/1988
EP  2353543 B1  9/2017
(Continued)

OTHER PUBLICATIONS

International Search Report and Written Opinion for PCT/ES2020/070666. Mailed Feb. 25, 2021. 12 pages.
(Continued)

*Primary Examiner* — Samuel G Gilbert
(74) *Attorney, Agent, or Firm* — Tristan A. Fuierer; Casimir Jones, S.C.

(57) ABSTRACT

A device for collecting uterine fluid is described which can be used in vivo in both animals and humans, without said use causing dilution of fluid components or damage to the endometrium.

21 Claims, 6 Drawing Sheets

(51) Int. Cl.
*A61D 19/02* (2006.01)
*A61D 19/04* (2006.01)

(58) Field of Classification Search
CPC .... A61B 2017/4225; A61B 2017/4216; A61B 17/43; A61B 17/435; A61B 17/425; A61B 17/4208
USPC ........................ 604/515, 906; 600/36, 35, 34
See application file for complete search history.

(56) References Cited

U.S. PATENT DOCUMENTS

| | | | |
|---|---|---|---|
| 5,137,030 A | 8/1992 | Darougar | |
| 6,695,767 B2 | 2/2004 | Martínez García et al. | |
| 6,726,619 B2 * | 4/2004 | Gil Pascual | A61D 19/027 600/35 |
| 10,799,269 B2 * | 10/2020 | Alvarez | A61B 17/435 |
| 2009/0048511 A1 * | 2/2009 | Desai | A61M 25/0075 604/247 |

FOREIGN PATENT DOCUMENTS

| | | |
|---|---|---|
| ES | 2156579 | 6/2001 |
| ES | 2348528 | 12/2010 |
| ES | 2532658 | 3/2015 |
| ES | 2532659 | 9/2015 |
| IL | 63793 | 10/1986 |
| WO | WO 2019064124 A1 | 4/2019 |

OTHER PUBLICATIONS

Extended European Search Report for the counterpart application EP 20882982. Mailed on Nov. 8, 2023. 6 pages.

* cited by examiner

A

B

C

A

B

C

A

B

DEVICE FOR COLLECTING UTERINE FLUID IN VIVO

CROSS-REFERENCE TO RELATED APPLICATIONS

This application is filed under the provisions of 35 U.S.C. § 371 and claims the priority of International Patent Application No. PCT/ES2020/070666, filed on 30 Oct. 2020 entitled "DEVICE FOR COLLECTING UTERINE FLUID IN VIVO" in the name of Rafael LATORRE REVIRIEGO, et al., which claims priority to Spanish Patent Application No. P201930958 filed on 31 Oct. 2019, both of which are hereby incorporated by reference herein in their entirety.

TECHNICAL FIELD OF THE INVENTION

The present invention relates to a device for collecting uterine fluid, that can be used in vivo both in animals and humans without said use causing dilution of the uterine fluid components or damage to the endometrium.

STATE OF THE ART

The benefits of supplementation of embryonic culture media with fluids from the female reproductive tract have promoted the development of strategies for collecting these fluids. Specifically, it has been shown that the composition of culture media for in vitro fertilisation (IVF) and embryonic culture affects the rates of implantation, pregnancy, and offspring weight at birth.

For this reason, an attempt has been made to mimic as much as possible the conditions of the embryo in the female reproductive tract. To do this, one possible strategy consists of reproducing as much as possible the composition of the chemically defined media to that of the reproductive fluids of the oviduct and uterus.

This entails a growing interest in developing methods for collecting these fluids in minimally invasive conditions, and without triggering changes in the qualitative and quantitative composition of the collected fluids.

In the case of the human species, the cervical canal and the lumen of the uterine cavity are anatomical structures of reduced dimensions, which makes vaginal access difficult. The epithelium lining these anatomical structures is very delicate and extremely vascularised. All of this complicates the collection of sufficiently large volumes of fluid to allow the characterisation and subsequent use thereof as a supplement to embryonic culture media.

The most recurrent uterine fluid collection strategy in humans is uterine lavage. This technique has allowed the identification of some proteins that constitute these fluids, but, since it is not possible to extrapolate the dilution factor at which the identified constituents are found, this technique does not allow the quantitative characterisation of all the constituents of the uterine fluid. Therefore, the use of uterine lavage precludes an accurate quantification of the constituents of the extracted fluids.

In order to avoid the limitations of uterine lavage, different methods of obtaining pure reproductive fluids have been tested, without dilution factors, mainly obtained by aspiration. The most widely used aspiration systems comprise the introduction of different types of embryo transfer cannulas.

The use of artificial insemination catheters has been also described since, unlike embryo transfer catheters, said other catheters have two side holes, allowing the collection of an increased volume of fluid. In this case, and by means of a vaginal speculum, the cervix is visualised, and the catheter is subsequently introduced until it is well positioned; it is then attached to a syringe to gradually vacuum and aspirate the fluid.

However, both embryo transfer cannulas and artificial insemination catheters used primarily in humans employ aspiration or an automatic vacuum source. They obtain a reduced sample volume and cause damage to the endometrium that could lead to bleeding, altering the original composition of the collected fluids.

On the other hand, in the porcine and bovine species, an ex vivo technique to obtain purified samples of oviductal and uterine fluid has been described (Patent ES2532658B2). However, ex vivo collection makes the activation of signalling pathways inherent in post-mortem cellular and biological processes, or of the coagulation cascade in excised organs, unavoidable.

In short, according to the state of the art, it can be noted that there are no known devices that allow collecting a reasonable volume of uterine fluid in vivo, without causing endometrial damage and/or blood or cervical mucus contamination.

Thus, it is still necessary to develop devices that allow the collection of these fluids under in vivo conditions.

BRIEF DESCRIPTION OF THE INVENTION

The present invention relates to a device for collecting uterine fluid in vivo by capillarity, wherein said device comprises:
  a hollow cylindrical tube (7) in turn comprising:
    a proximal portion (1), containing a distal end (1a) and a proximal end (1b), and wherein said proximal portion (1) allows the insertion and fastening of a push mechanism (9) for pushing the device into the uterus;
    an intermediate portion (2), containing a distal end (2a) and a proximal end (2b); and
    wherein the proximal end (2b) of the intermediate portion (2) is connected to the distal end (1a) of the proximal portion (1);
  a solid cylindrical distal part (3), containing a distal end (3a) and a proximal end (3b), wherein the proximal end (3b) of the distal part (3) is connected to the distal end (2a) of the intermediate portion (2), so that said proximal end (3b) closes the hollow tube (7) at said distal end (2a);
and where said intermediate portion (2) is characterised in that it further comprises at least one slot (6) with a length of at least 2 cm and a width less than or equal to 1 mm, which allow the uterine fluid to enter, by capillarity, from the outside to the inside of said intermediate portion (2), said uterine fluid being retained inside the tube (7).

BRIEF DESCRIPTION OF THE FIGURES

FIG. 5A shows the external aspect of a metal guide that can be used as a push mechanism (9) for the device of the present invention. FIG. 5B shows an enlarged detail of the end (B') intended to be inserted into the proximal portion (1) of the tube (7) of the device of the invention. FIG. 5C shows an even more enlarged detail of said end (C'), wherein the fastening means (5) used, by threaded coupling, can be seen.

FIG. 6A shows a sagittal section of a device according to the invention, wherein a push mechanism (9), such as the one described in FIG. 5, is fastened. FIG. 6B shows an enlarged detail of the part marked as (B') in FIG. 6A, showing the detail of the fastening means (5) of the push mechanism by threaded coupling. FIG. 6C shows the external aspect of the device shown in FIG. 6A.

FIG. 7A shows the external aspect of a device according to the invention, to which a push mechanism (9), such as the one described in FIG. 5, is fastened, and inserted in a sheath (8), such as the one described in FIG. 4. FIG. 7B shows the sagittal section of the device of FIG. 7A.

DETAILED DESCRIPTION

Figure 1:
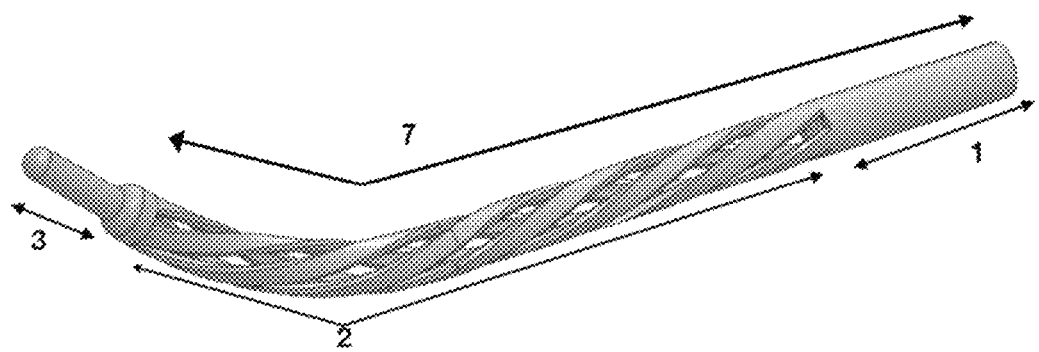
FIG. 1. External appearance of a device according to the present invention.

The present invention describes a flexible in vivo uterine fluid collection device whose design allows capturing uterine fluid by capillarity in an effective and reproducible way that can be extrapolated to different species of mammals.

For the purposes of the present invention, capillarity is defined as the property of liquids whereby they are able to flow in a more or less narrow tube due to the surface tension of said liquid with the interior of said tube.

For purposes of the present invention, the term "comprises" denotes that it includes a group of features but does not exclude the presence of other features, provided that the presence of the other features does not render the claim unworkable. In addition, the terms "consists of", "contains", "includes", "has", "encompasses" and synonyms of said terms, should be interpreted in the same way as the term "comprises".

Additionally, for purposes of the present invention, the term "comprises" may be replaced by any of the terms "consists of", "consists in", "consists substantially of" or "consists substantially in". Thus, when the term "comprises" relates to a group of technical features A, B and C, it should be interpreted that it may additionally include other technical features in addition to technical features A, B and C, provided that the presence of the other features does not make the claim unworkable, but it can also be interpreted as only comprising said features A, B and C or, comprising substantially said features A, B and C and, thus, the term "comprises" referring to a group comprising the features A, B, and C should be construed to include also a group consisting of features A, B, and C, or consisting substantially of features A, B, and C.

Thus, the present invention relates to a device for collecting uterine fluid in vivo by capillarity, where said device comprises:
 a hollow cylindrical tube (7) in turn comprising:
  a proximal portion (1), containing a distal end (1a) and a proximal end (1b), and wherein said proximal portion (1) allows the insertion and fastening of a push mechanism (9) for pushing the device into the uterus;
  an intermediate portion (2), containing a distal end (2a) and a proximal end (2b); and
  wherein the proximal end (2b) of the intermediate portion (2) is connected to the distal end (1a) of the proximal portion (1);
 a solid cylindrical distal part (3), containing a distal end (3a) and a proximal end (3b), wherein the proximal end (3b) of the distal part (3) is connected to the distal end (2a) of the intermediate portion (2), so that said proximal end (3b) closes the hollow tube (7) at said distal end (2a);
 and where said intermediate portion (2) is characterised in that it further comprises at least one slot (6) with a length of at least 2 cm and a width less than or equal to 1 mm, which allow the uterine fluid to enter, by capillarity, from the outside to the inside of said intermediate portion (2), said uterine fluid being retained inside the tube (7).

In one embodiment of the invention the device is characterised by being made of a flexible material. Preferably, the device is made of a biocompatible material, more preferably plastic.

The device, is thus a catheter that can be made of any biocompatible material in order to be in contact with mucous membranes, ensuring safe collection, without toxic effects for the uterine fluid donor.

On the other hand, both the tube (7) and the distal part (3) are cylindrical in shape, necessary to be able to adapt to the spherical lumen of the cervical canal.

In one embodiment the tube (7) comprises:
 a proximal portion (1) of variable length. The purpose of this portion is to adapt a guide or any mechanism (9) that allows the catheter to be pushed into the uterus.
 Preferably, the proximal portion (1) has a length comprised between 1 and 3 cm.
 Preferably, the outer diameter of this proximal portion (1) is comprised between 2 and 7 mm. Also preferably, the inner diameter of this proximal portion (1) is comprised between 0.5 and 5 mm.
 an intermediate portion (2) of variable length. This portion allows the device to adapt to the uterus dimensions and, further, also allows the catheter to be in contact with the largest possible endometrial surface.
 Preferably, the intermediate portion (2) has a length comprised between 2 and 12 cm.
 Preferably, this intermediate portion (2) has a progressive curvature (4), so that the catheter adapts to the curvature of the uterine cavity from the body of the uterus towards the uterine tubes or towards the uterine horns. More preferably said curvature (4) is between 10 and 30 degrees. Preferably, the outer diameter of this intermediate portion (2) is between 2 and 7 mm and its inner diameter is between 0.5 and 5 mm.
 Lastly, and following the intermediate portion (2), the device has a compact (i.e., solid) and closed distal part (3).
 Preferably the distal part (3) has a length comprised between 0.2 and 5 cm.
 Also preferably, the outer diameter of this distal part (3) is smaller than the rest of the device, to favour entry into the cervix, acting as a guide.
 Preferably, the distal part (3) has a diameter comprised between 0.5 mm and 4 mm.
 In addition, this distal part (3) is preferably flexible, in order to adapt to the vaginal and uterine orifices of the cervix, ensuring its passage through the cervix, without causing any iatrogenic injury.

Thus, the size of the device of the invention is variable, including smaller sizes for, for example, humans and larger sizes for, for example, mares and cows.

In a preferred embodiment of the device according to the present invention, the proximal portion (1) and the intermediate portion (2) have an outer diameter comprised between 2 mm and 7 mm.

Preferably the proximal portion (1) and the intermediate portion (2) have an inner diameter comprised between 0.5 mm and 5 mm.

In a preferred embodiment of the device according to the present invention, the intermediate portion (2) has a length comprised between 2 cm and 12 cm and a progressive curvature (4) of between 10 and 30 degrees.

Preferably, the distal part (3) has a smaller diameter than the outer diameter of the proximal portion (1) and that of the intermediate portion (2), to facilitate the passage of the device through the cervical canal.

In a preferred embodiment of the device of the present invention, the distal end (3a) of the distal part (3) has a blunt shape. Preferably, the distal end (3a) of the distal part (3) is hemispherical in shape.

In this way, the device of the invention has an anatomical design so that its length and diameter adapt to the anatomy of the female reproductive system of any mammal, the cervix and uterine lumen of the species under study and, has the physical properties necessary to prevent endometrial damage and to maximise fluid collection.

In order that the device may reach the uterine cavity free of vaginal and cervical secretions, it is covered by a sheath. In this regard, sheaths made of polypropylene or any biocompatible material, variable in size according to each species, can be used.

Thus, in one embodiment, the device according to the present invention further comprises a hollow sheath (8) open at least at one end, which concentrically wraps the tube (7) and the distal part (3), so that the device can move freely along the longitudinal axis of the sheath (8). If the sheath is open at one end only, it must be configured so that the distal part (3) can pass through it.

Figure 7:
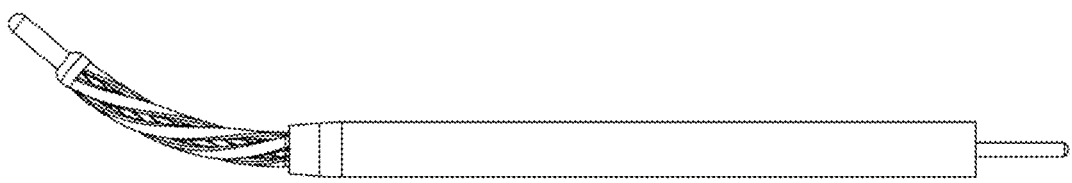
FIG. 7.
Figure 7:
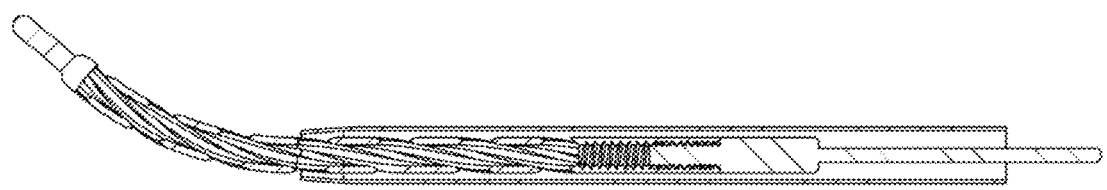

In one embodiment of the invention, the sheath (8) is open at both ends, comprising a distal opening and another proximal opening, wherein the distal opening progressively narrows, adopting an acuminate shape that adapts to the distal end (3a) of the distal part (3), as shown in FIG. 7.

In one embodiment of the invention, the push mechanism (9) is fastened to the proximal end (1a) of the proximal portion (1) and is configured to move the entire device of the invention along the sheath (8) until reaching its distal opening. In this embodiment of the invention, the sheath (8) is pushed with the device of the invention along the vagina and cervix. Once in the uterine cavity, the position of the sheath and the device is fixed along the interior of the sheath to bring the device into contact with the uterine mucosa and allow uterine fluid collection by capillarity. In one embodiment of the invention, the same sequence of manoeuvres is carried out to remove the device, but in the opposite direction, applying a pulling instead of a pushing force. Thus, in one embodiment of the invention, the device is stored inside the sheath (8), by pulling the push system, and then the sheath (8) is extracted with the device inside.

The device has further a design that allows fluid collection at several places, since the uterine fluid is not located in a specific place but is distributed evenly over the surface of the endometrium. Thus, to the extent that the places of access to the interior of the device cover a larger surface, there will be more opportunities for collecting fluid by capillarity. For this, the device comprises slots (6), in a variable number, arranged in a spiral, or in any other way, and distributed in the intermediate part (2) of the tube (7), allowing the entry of fluid by capillarity from different points of the endometrium, maximising the collection efficiency.

Thus, the slots (6) preferably have a length of at least 2 cm and a width equal to or less than 1 mm.

In a preferred embodiment of the invention, the device comprises at least 3 slots.

In a preferred embodiment of the invention, the slots (6) extend from the distal end (2a) to the proximal end (2b) of the intermediate portion (2).

In a more preferred embodiment of the invention, the slots (6) extend from the distal end (2a) to the proximal end (2b) of the intermediate portion (2) in a helical manner, or with a helical distribution.

Figure 2:
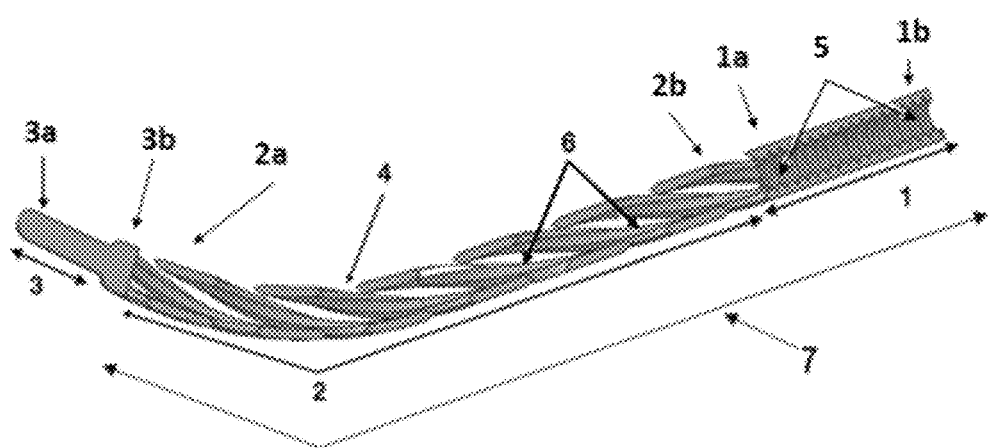
FIG. 2. Sagittal section of a device according to the present invention wherein the device interior can be seen.
Figure 3:
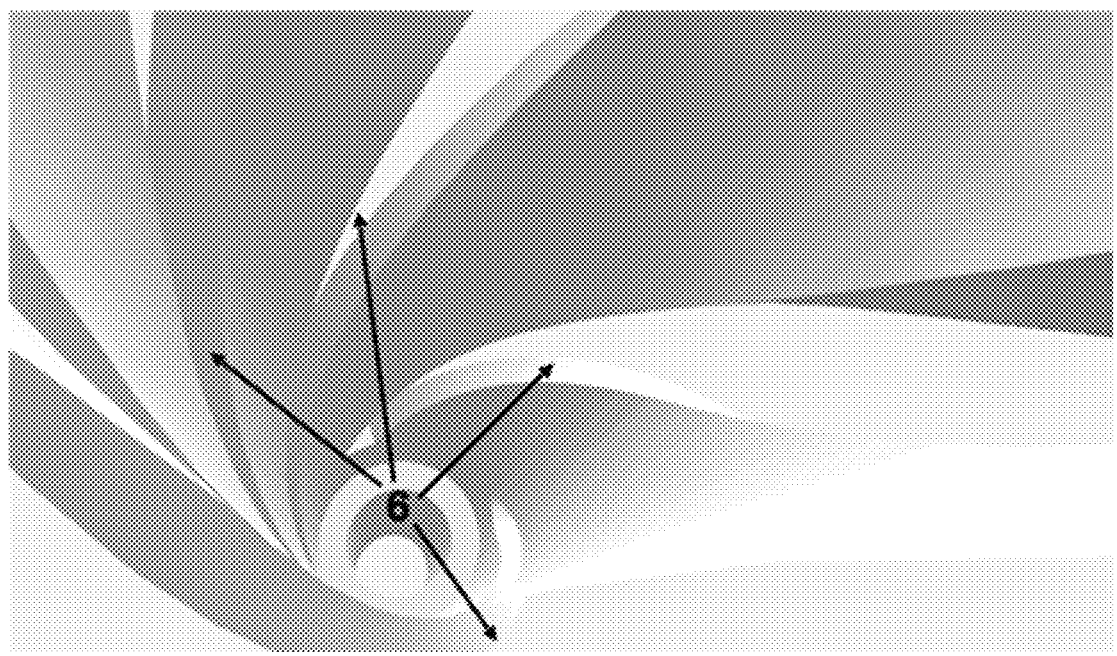
FIG. 3. Intraluminal view of a device according to the present invention.

FIGS. 1 and 2 show the appearance and sagittal section of a preferred embodiment of the device of the invention wherein the slots (6) extend from the distal end (2a) to the proximal end (2b) of the intermediate portion (2) in a helical manner, or with a helical distribution. FIG. 3 shows the intraluminal view of this embodiment of the device of the invention.

The slots increase the contact surface with the endometrium in the three spatial planes, increasing fluid collection. In addition, the slots give the catheter a high degree of flexibility so that it can be manipulated within the sheath and once it is placed in the uterine cavity. In addition, the slots exert a trawling effect by capillarity on the endometrium, without tearing it, which favours the entry of fluid into the interior of the device.

In a preferred embodiment of the invention, the width of the slots (6) is comprised between 100 µm and 700 µm.

In one embodiment of the invention, the interior of the proximal portion (1) comprises fastening means (5) of the push mechanism (9) to said proximal portion (1).

In one embodiment of the invention, the push mechanism consists of a rod made of any material, preferably plastic, which is fastened to the device of the invention allowing the movement forward thereof inside the sheath (8). In one embodiment of the invention, the push mechanism (9) is fastened to the interior of the proximal portion (1) of the device of the invention, and the fastening means (5) is a threaded coupling, a quick coupling or is even bound to the interior said proximal portion (1).

Figure 4:
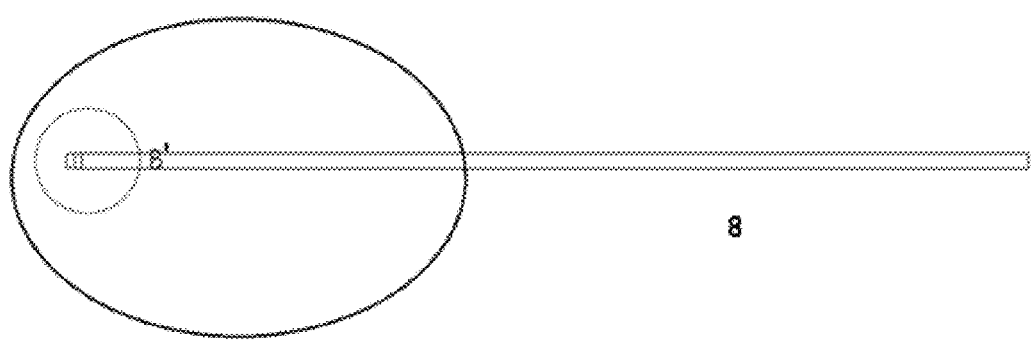
FIG. 4. External aspect of an embodiment of the sheath (8) open at both ends, which can be used with the device of the present invention. The narrowest distal opening is marked with a circle indicated as (B'), adopting an acuminate shape that adapts to the distal end (3a) of the distal part (3).
Figure 5:
FIG. 5.
Figure 5:
Figure 5:
Figure 6:
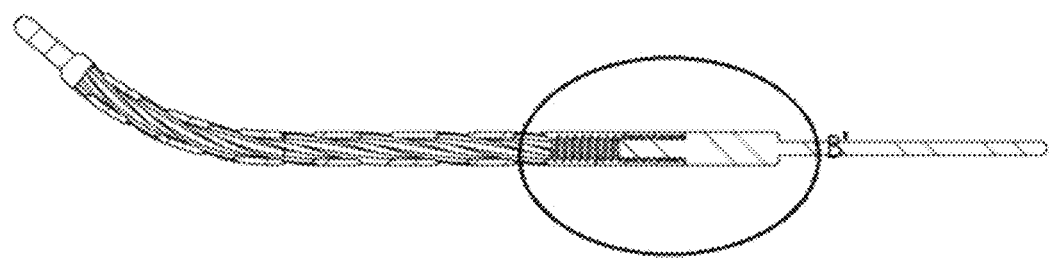
FIG. 6.
Figure 6:
Figure 6:

The embodiment of the push mechanism (9) shown in FIG. 5 is a metal rod that is fastened to the interior of the proximal portion (1) of the tube (7) of a preferred embodiment of the device of the invention, by means of threaded coupling. FIG. 6 shows a preferred embodiment of the device of the invention, fastened to the metal rod (9) shown in FIG. 5. FIG. 7 shows the assembly of a preferred embodiment of the device of the invention, fastened to the metal rod (9) shown in FIG. 5, and wrapped by a sheath embodiment (8) shown in FIG. 4.

The discharge of the uterine fluid collected inside the device of the invention, once extracted, can be carried out in several ways, for example, by subjecting it to centrifugation.

Unlike other catheters, this one is completely atraumatic when it comes into contact with the endometrial mucosa. In addition, the device of the invention collects the fluid by capillarity, so it is not necessary to use a suction force as it is done in commercial intrauterine catheters for embryo transfer or endometrial or cervical mucus biopsy.

In addition, the device for collecting uterine fluid in vivo, of the invention, allows pure fluid to be collected without dilution factors present when collection is carried out by traditional uterine lavage. On the other hand, the design of the device, having a multipoint collection system, thanks to the slots (6), allows for a collection of a sufficient volume of fluid to carry out the quality controls necessary for storage under the required sanitary conditions, for its use as a supplement for embryonic culture media or for precision research work requiring absolute quantitative characterisation.

Finally, the use of the device of the invention allows the collection of uterine fluid free of cell debris, of cervical mucus, or of traces of blood, since the use of the device of the invention does not cause haemorrhages when it is in contact with the endometrium.

EXAMPLES

Comparative Example 1: Evaluation of Prior Art Devices

Various devices already on the market with a potential use in uterine fluid collection have been evaluated. These devices have been tested first in ex vivo ovine uteri from the slaughterhouse. In addition, an in vivo experimental phase was carried out, using endoscopic techniques, in order to evaluate, with direct vision, the passage of the devices through the cervical canal and uterine cavity. In the human species, different catheters have been tested in vivo in oocyte donors from fertility clinics and in ex vivo conditions with uteri of women having undergone hysterectomies. Specifically, the devices studied, and the results obtained are the following:

A. HydraFlock® (Medical wire): Designed for a higher absorbency compared to standard swabs. HydraFlock® fibres have a microstructure that allows rapid absorption and maximum release of biological samples. It is not traumatic for the mucosa, it absorbs some fluid, but its main limitations are that it does not allow the subsequent release of the collected fluid, it remains between its fibres and centrifugation is not effective.

B. Embryo transfer catheters from different commercial brands:

Tests have been carried out with the following devices:
Embryo Transfer Catheter Set from Labotect Labor-Technik-Gottingen GMBH;
Kitazato® ET catheter
Emtrac Delphin (Gynetics®)
Wallace® Classic (Coopersurgical®)

Aspiration with these embryo transfer catheters was performed by coupling syringes with different calibres (1 ml, 2 ml, 5 ml, and 10 ml) and the Aspirator 3 automatic aspiration system.

In all cases, uterine fluid was collected both ex vivo and in vivo, but only occasionally and in very small amounts (0.7 µl). The aspiration point is very small, and therefore with limited effectiveness, and may cause haemorrhage at the aspiration area.

C. Insemination Devices: Trials have been carried out with artificial insemination catheters (Standard Model 120400S from CDD Laboratoires) that have two side holes.

Aspiration with these embryo transfer catheters is also performed by coupling syringes of different calibres (1 ml, 2 ml, 5 ml, and 10 ml).

With these devices, it is possible to collect uterine fluid both ex vivo and in vivo, but only occasionally and in very small amounts, given that in the two experiments carried out, no measurable volume of fluid was collected. The aspiration point is very small, and therefore with limited effectiveness, and may cause haemorrhage at the aspiration area.

D. Pipelle de Cornier. Endometrial mucosa aspiration curette (Laboratoire CCD): This device is made of flexible and transparent polypropylene of outer diameter 3.10 mm, inner diameter 2.6 mm and 23.5 cm long, with a side hole 2.1 mm in diameter at the distal end and four markings 4, 7, 8 and 10 cm from the distal end. It has an internal plunger to cause aspiration of the endometrium.

It allows the collection of uterine fluid (a mean value of 12.8±22.5 µl of uterine fluid was collected, n=15), although being designed to remove the endometrium, it caused haemorrhage (a mean value of 0.31±0.15 g/dL of haemoglobin was collected).

E. Mucat® (CCD Laboratory): Device indicated for direct exocervical or endocervical aspiration and Hühner test. It is less aggressive on the endometrium than the Pipelle de Cornier because it has a smooth opening at the distal tip. Aspiration, as with the Pipelle de Cornier, is also carried out with the integrated plunger, without a syringe. It allows the collection of fluid (a mean value of 21.4±19.1 µl was collected, n=32) although it produces a considerable amount of blood (a mean value of 0.12 g/dl of haemoglobin was collected), and it also drags along tissue portions and mucus.

Example 2: Device of the Invention for Collecting Uterine Fluid in Humans

The device was manufactured in transparent MED610 biocompatible material (Stratasys Headquarters). The proximal portion (1) of the manufactured device was 1 cm in length, with a 2.5 mm outer diameter, and a 1.5 mm inner diameter. The intermediate portion (2) of the manufactured device was 4 cm in length, with a 2.5 mm outer diameter and a 1.5 mm inner diameter. The intermediate portion (2) of the manufactured device had a curvature angle (4) of 30° and had 4 slots (6) extending from the distal end (2a) to the proximal end (2b) of the intermediate portion (2) with a slot width of 500 µm, through which the uterine fluid penetrates and is trapped by capillarity. The interior of the manufactured proximal portion (1) included a screw system allowing the coupling of a guide (e.g., of metal) for pushing the device into the uterus. The distal part (3) of the manufactured device is 1 cm in length and 1.5 mm in diameter.

Uterine Fluid Collection Procedure.

The device was sterilised according to the maximum temperature it withstands, that is, by gas plasma at temperatures below 45-50° C. For uterine fluid collection in humans, the following steps were carried out:

a. Positioning the patient in the lithotomy position. Inserting the vaginal speculum to expose the cervix. The condition of the cervix and endometrium is checked, and the length and angle of curvature of the device, and the guide, are decided before use.

b. Screwing the metal guide (push mechanism (9)) onto the device and placing it inside the sheath (8). In this case, an introducer sheath (8) with a smooth surface was used to minimise friction (Radifocus® Introducer II Temuro interventional systems) designed for a vascular approach, and a metal guide, manufactured by the Technical Unit of the University of Murcia, comprising a metal plunger that acts as a push mechanism (9) was used (see FIG. 6).

c. Washing the vulva and vagina with sterile saline solution.

d. Inserting the device, covered by the sheath, into the cervix.
e. Checking that the device reaches the uterus with ultrasound control. The metal plunger of the metal guide is pressed to push the device deep into the uterus.
f. Performing slight movements for 5 to 10 min to stimulate the entry of fluid by capillarity through the slots.
g. Re-inserting the device into the sheath, pulling with the push system.
h. The device is removed, the vaginal speculum is extracted, and the patient is kept at rest.
i. The device is transferred to a 10 ml tube.
j. It is centrifuged at 1200 g for 5 min.
k. The device is removed. The fluid is aliquoted and stored at −80° C.

TABLE 1

| DONORS | FLUID (µl) |
|---|---|
| 1 | 10 |
| 2 | 34 |

Example 3: Device of the Invention for Uterine Fluid Collection in Bovine Species The device was made of transparent MED610 biocompatible material. The proximal portion (1) is 2 cm in length, having a 5 mm outer diameter and a 3 mm inner diameter. The intermediate portion (2) is 8 cm length, having a 5 mm outer diameter and a 3 mm inner diameter. This intermediate portion (2) was designed with a 10° angle of curvature (4) and 4 slots (6), which extend from the distal end (2a) to the proximal end (2b) of said intermediate portion (2) and are 500 µm in width, through which the uterine fluid penetrates and is trapped by capillarity. The interior of the proximal portion (1) forms a screw system that allows the coupling of a guide (9), e.g. of metal, to push the device into the uterus. Additionally, the distal part (3) of the device is 3 cm in length and with a 3 mm diameter.

Uterine Fluid Collection Procedure.

In order to use the device, it is first sterilised according to the maximum temperature that it withstands, that is, by gas plasma at temperatures below 45-50° C. The steps to follow for the use of the device in bovine species are as follows:
A. The cow is placed in a squeeze chute and rectal palpation is performed to locate the ovary with a corpus luteum.
B. Low epidural anaesthesia (2% xylocaine) is performed.
C. The perineal region and vulva are washed with disinfectant soap and water and the region is dried.
D. Screwing the metal guide (push mechanism (9)) onto the device and placing it inside the sheath (8). In this case, a probe designed for mare insemination (Equine Deep AI Pipette REF 17209/1175 MINITUBE) was used as sheath (8), with a smooth round tip for smooth and flexible insertion for easy handling. And a metal guide, manufactured by the Technical Unit of the University of Murcia, comprising a metal piston that acts as a push mechanism (9), has been used (see FIG. 6).
E. Before inserting the device, sterile lubricant is placed in the vagina to allow the device to enter more easily through the cervix.
F. With the left hand, the cervix is grasped through the wall of the rectum.
G. The device is inserted into the cervical canal with the right hand.
H. It is checked that the device reaches the uterus with ultrasound control.
I. The metal plunger is pressed to push the device into the uterine cavity.
J. Wait 5 to 10 min, moving the device slightly to stimulate the entry of fluid by capillarity through the slots.
K. The device is re-protected within the sheath.
L. The device is gently extracted, and the hand is removed from the rectum.
M. The device is transferred to a 10 ml tube.
N. It is centrifuged at 1200 g for 5 min.
O. The catheter is removed. The fluid is aliquoted and stored at −80° C.,

TABLE 2

| Cows | Cycle phase | Collected fluid (µl) |
|---|---|---|
| Cow 1 | Periovulatory | 300 |
| Cow 2 | Periovulatory | 20 |
| Cow 3 | Periovulatory | 30 |
| Cow 1 | Luteal | 18 |
| Cow 2 | Luteal | 11 |
| Cow 3 | Luteal | 6 |

The collected uterine fluid does not contain dilution factors present when collection is carried out by traditional uterine lavage. In addition, the volume collected is sufficient to carry out quality controls, which require at least 2-5 µl of fluid, necessary for storage under the required sanitary conditions, for use as a supplement to embryonic culture media or for precision research work that requires absolute quantitative characterisation.

The fluid collected from both the human and cow donors in the study showed no cell debris or cervical mucus. The colour of the collected fluid is translucent yellow, demonstrating the absence of haemorrhage by contact with the endometrium with this collection method.

The invention claimed is:
1. A device for collecting uterine fluid in vivo, said device comprising:
  a hollow cylindrical tube (7) comprising:
    a proximal portion (1), having a distal end (1a) and a proximal end (1b), wherein said proximal portion (1) is configured to allow the insertion and fastening of a push mechanism (9) for pushing the device into the uterus;
    an intermediate portion (2), having a distal end (2a) and a proximal end (2b);
    and wherein the proximal end (2b) of the intermediate portion (2) is connected to the distal end (1a) of the proximal portion (1);
  a solid cylindrical distal part (3), having a distal end (3a) and a proximal end (3b), wherein the proximal end (3b) of the distal part (3) is connected to the distal end (2a) of the intermediate portion (2), so that said proximal end (3b) closes the hollow tube (7) at said distal end (2a);
wherein said intermediate portion (2) further comprises at least one slot (6) with a length of at least 2 cm and a width less than or equal to 1 mm, which is configured to allow entry of uterine fluid, by capillarity, into an interior of said intermediate portion (2), wherein the uterine fluid is retained inside the tube (7).

2. The device according to claim 1, wherein the at least one slot (6) has a width between 100 μm and 700 μm.

3. The device according to claim 1, wherein the at least one slot (6) extends from the distal end (2a) to the proximal end (2b) of the intermediate portion (2).

4. The device according to claim 1, wherein the at least one slot (6) extends from the distal end (2a) to the proximal end (2b) of the intermediate portion (2) in a helical manner or helical distribution.

5. The device according to claim 1, wherein the intermediate portion (2) comprises at least three slots (6).

6. The device according to claim 1, wherein an interior of the proximal portion (1) comprises fastening means (5) for fastening the push mechanism (9) to said proximal portion (1).

7. The device according to claim 6, wherein the fastening means (5) is a threaded coupling.

8. The device according to claim 1, wherein the proximal portion (1) and the intermediate portion (2) have an outer diameter comprised between 2 mm and 7 mm.

9. The device according to claim 8, wherein the distal part (3) has a smaller diameter than the outer diameter of the proximal portion (1) and of the intermediate portion (2), to facilitate the passage of the device through a cervical canal.

10. The device according to claim 1, wherein the proximal portion (1) and the intermediate portion (2) have an inner diameter comprised between 0.5 mm and 5 mm.

11. The device according to claim 1, wherein the proximal portion (1) has a length between 1 cm and 3 cm.

12. The device according to claim 1, wherein the intermediate portion (2) has a length of 2 cm to 12 cm in length and a progressive curvature (4) of between 10 to 30 degrees.

13. The device according to claim 1, wherein the distal end (3a) of the distal part (3) has a blunt shape.

14. The device according to claim 1, wherein the distal end (3a) of the distal part (3) is hemispherical in shape.

15. The device according to claim 1, wherein the distal part (3) has a diameter comprised between 0.5 mm and 4 mm.

16. The device according to claim 1, wherein the distal part (3) has a length of 0.2 cm to 5 cm.

17. The device according to claim 1, characterized in that the device is made of a flexible material.

18. The device according to claim 1, characterized in that the device is made of a biocompatible material.

19. The device according to claim 1, further comprising a hollow sheath (8) having a length along a longitudinal axis and two ends, wherein at least one end is open, wherein the hollow sheath concentrically wraps the tube (7) and the distal part (3), so that the device can move freely along the longitudinal axis of the sheath (8).

20. A method of collecting uterine fluid from a subject using the device of claim 1, said method comprising:
    fastening the push mechanism (9) to the proximal end (1b) of the proximal portion (1) of the device;
    inserting the device into a proximal opening of a hollow sheath (8) until reaching a distal opening of the hollow sheath (8), wherein the hollow sheath (8) has a length along a longitudinal axis and two ends comprising the distal opening and the proximal opening, and wherein the device can move freely along the longitudinal axis of the hollow sheath (8);
    inserting the hollow sheath (8) with the device positioned therein into the vagina of the subject;
    pushing the device into the uterus of the subject until the device is in contact with uterine mucosa;
    collecting uterine fluid by capillarity via the at least one slot (6), wherein said uterine fluid is retained inside the tube (7).

21. The method of claim 20, further comprising removing the device from the vagina of the subject, said removal comprising:
    pulling the device back into the hollow sheath (8); and
    extracting the hollow sheath (8) with the device positioned therein from the vagina of the subject.

* * * * *